L. VAN ATTEN.
ELECTRICAL CONNECTOR.
APPLICATION FILED JUNE 18, 1920.

1,383,040. Patented June 28, 1921.

WITNESSES

INVENTOR
L. VAN ATTEN
BY
ATTORNEYS

UNITED STATES PATENT OFFICE.

LEWIS VAN ATTEN, OF OSSINING, NEW YORK.

ELECTRICAL CONNECTOR.

1,383,040. Specification of Letters Patent. Patented June 28, 1921.

Application filed June 13, 1920. Serial No. 389,911.

*To all whom it may concern:*

Be it known that I, LEWIS VAN ATTEN, a citizen of the United States, and a resident of Ossining, in the county of Westchester and State of New York, have invented a new and Improved Electrical Connector, of which the following is a full, clear, and exact description.

This invention relates to improvements in electrical connectors, an object of the invention being to provide a connector which can be securely locked so as to prevent possibility of accidental disconnection due to vibration or other causes, and this connector is especially designed for use in restricted areas, such as the inside of motor cases, and such places as have restricted free length of cable or wire.

A further object is to provide a connector of the character stated which can be manufactured and sold at an extremely low price, and which will most efficiently perform the functions for which it is intended.

With these and other objects in view the invention consists in certain novel features of construction, and combinations and arrangements of parts, as will be more fully hereinafter described and pointed out in the claims.

In the accompanying drawings—

Figure 1:
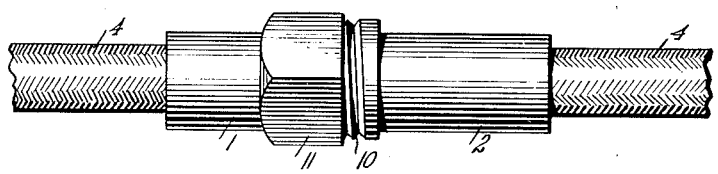
Figure 1 is a view in elevation illustrating my improved connector.
Figure 2:
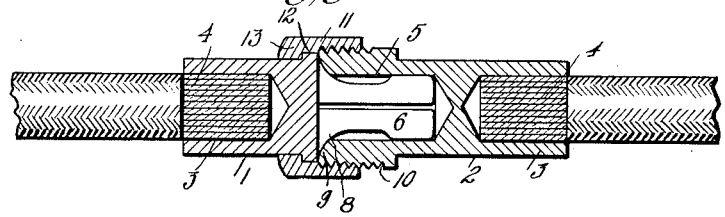
Fig. 2 is a view in longitudinal section.
Figure 3:
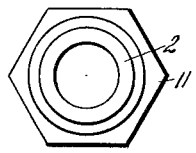
Fig. 3 is an end view of the connector with the electric conductor removed.
Figure 4:
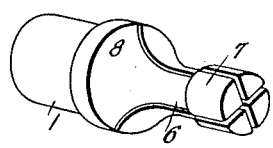
Fig. 4 is a perspective view of the connector or terminal member 1.

My improved electrical connector comprises three parts; namely, terminal members 1 and 2 and a securing nut 11. Both of the members 1 and 2 are provided in their outer ends with sockets 3 for the accommodation of wires, cables, or other electricity conductors 4 which are secured in the sockets in any approved manner.

The terminal member 2 is provided in its free end with a cylindrical socket 5 to receive a stud 6 of member 1. The stud 6 is split longitudinally and expanded, and provided at its extreme end with sections 7 which form a head which snugly fits the socket 5 and insures a mechanically perfect connection and the end of said stud portion where it joins the main body of the member 1 is curved or flared outwardly forming curved contacting surfaces 8 which fit snugly against curved contacting surfaces 9 on the end of the member 2.

The socket member 2 is externally screw threaded, as shown at 10, and the coupling nut 11 is adapted to engage the threads 10. This coupling nut 11 fits over an annular enlargement 12 on the member 1 and has an internal annular flange 13 fitting behind the flange 12 so that when the nut 11 is screwed onto the member 2, the two members 1 and 2 will be securely locked together.

The nut 11, therefore, constitutes a coupling union which has free turning movement on the member 1 and screw threaded engagement with the member 2 so that after the stud 6 is inserted in the socket 5, the coupling nut 11 is screwed into place to lock the members together and insure a firm electrical connection which cannot be accidentally disconnected by vibration or other causes.

Various slight changes might be made in the general form and arrangement of parts described without departing from the invention, and hence I do not limit myself to the precise details set forth, but consider myself at liberty to make such changes and alteratons as fairly fall within the spirit and scope of the appended claims.

I claim:

1. An electrical connector, comprising a socket member, an expansible stud member adapted to engage in the socket member, one of said members having external screw threads, and a nut having rotary mounting on the other of said members and adapted to engage said screw threads whereby said members are coupled together.

2. An electrical connector, comprising a socket member having external screw threads at its socket end, a stud member, a longitudinally split expansible stud on said stud member engaging in said socket, said stud member having an annular flange thereon, a nut having rotary mounting on the flange, and an internal annular flange on the nut fitting behind the flange of the stud member and having internal screw threads engaging the screw threads of the socket member.

3. An electrical connector, comprising a socket member, a stud member adapted to engage in the socket member, one of said members having external screw threads, a nut having rotary mounting on the other of said members and adapted to engage said screw threads whereby said members are coupled together, said stud at its base portion having an outwardly tapering surface, and said socket member at its end having a tapering surface engaging the tapering surface of the base of the stud.

LEWIS VAN ATTEN.